United States Patent
Liao et al.

(10) Patent No.: US 9,851,904 B2
(45) Date of Patent: Dec. 26, 2017

(54) GARBAGE COLLECTION WHILE MAINTAINING PREDETERMINED WRITING SPEED

(71) Applicant: EpoStar Electronics (BVI) Corporation, Tortola (VG)

(72) Inventors: Shih-Tien Liao, Hsinchu (TW); Hung-Chih Hsieh, Hsinchu County (TW)

(73) Assignee: EpoStar Electronics (BVI) Corporation, Tortola (VG)

( * ) Notice: Subject to any disclaimer, the term of this patent is extended or adjusted under 35 U.S.C. 154(b) by 0 days.

(21) Appl. No.: 15/069,963

(22) Filed: Mar. 14, 2016

(65) Prior Publication Data

US 2017/0206006 A1    Jul. 20, 2017

(30) Foreign Application Priority Data

Jan. 20, 2016  (TW) .............................. 105101648 A

(51) Int. Cl.
*G06F 3/06* (2006.01)
*G06F 11/10* (2006.01)
*G06F 12/02* (2006.01)

(52) U.S. Cl.
CPC .............. *G06F 3/061* (2013.01); *G06F 3/064* (2013.01); *G06F 3/0659* (2013.01); *G06F 3/0679* (2013.01); *G06F 11/1044* (2013.01); *G06F 11/1064* (2013.01); *G06F 12/0246* (2013.01); *G06F 12/0253* (2013.01); *G06F 12/0269* (2013.01); *G06F 2212/1016* (2013.01); *G06F 2212/214* (2013.01); *G06F 2212/403* (2013.01); *G06F 2212/7205* (2013.01)

(58) Field of Classification Search
CPC ............. G06F 12/0246; G06F 12/0253; G06F 12/0269; G06F 12/0276; G06F 2212/7205
USPC ......................................................... 711/103
See application file for complete search history.

(56) References Cited

U.S. PATENT DOCUMENTS

| | | | | |
|---|---|---|---|---|
| 2010/0191901 A1* | 7/2010 | Toyama | ................ | G06F 3/0613 711/103 |
| 2015/0058534 A1* | 2/2015 | Lin | ....................... | G06F 3/0656 711/103 |
| 2016/0117251 A1* | 4/2016 | Lin | ....................... | G06F 3/0613 711/129 |
| 2016/0321172 A1* | 11/2016 | Jinzenji | ............... | G06F 12/0246 711/103 |

* cited by examiner

*Primary Examiner* — Than Nguyen
(74) *Attorney, Agent, or Firm* — JCIPRNET

(57) ABSTRACT

A memory management method, a memory storage device and a memory control circuit unit are provided. The method includes: receiving first data; detecting a total number of first type physical erasing units not storing valid data; performing a first procedure if the total number is less than a first threshold value. The first procedure includes: receiving second data from a rewritable non-volatile memory module; temporarily storing the first data and the second data; dynamically determining a writing rule according to a storage status of the rewritable non-volatile memory module and storing the first data and the second data into the rewritable non-volatile memory module according to the determined writing rule. Therefore, a writing speed of the rewritable non-volatile memory module corresponding to the first data in the first procedure becomes stable.

21 Claims, 8 Drawing Sheets

US 9,851,904 B2

GARBAGE COLLECTION WHILE MAINTAINING PREDETERMINED WRITING SPEED

CROSS-REFERENCE TO RELATED APPLICATION

This application claims the priority benefit of Taiwan application serial no. 105101648, filed on Jan. 20, 2016. The entirety of the above-mentioned patent application is hereby incorporated by reference herein and made a part of this specification.

BACKGROUND

Technology Field

The present disclosure relates to a memory technique, and particularly relates to a memory management method, a memory storage device and a memory control circuit unit.

Description of Related Art

Digital cameras, mobile phones and MP3 players are quickly developed in recent years, so that consumer demands for storage media have also rapidly increased. Since a rewritable non-volatile memory module (for example, a flash memory) has characteristics of data non-volatility, low power consumption, small volume, and non-mechanical structure, etc., it is adapted to be built in the aforementioned various portable multimedia devices.

Generally, the rewritable non-volatile memory device is configured with normally used physical blocks and spare physical blocks. When data from a host system is to be stored, the data is stored in the spare physical blocks. The spare physical blocks stored with data from the host system are changed to the normally used physical blocks. When data in a certain normally used physical block is deleted by the host system, such physical block is erased and is changed into a spare physical block.

In order to ensure a normal operation of the rewritable non-volatile memory device, a total number of the spare physical blocks in the rewritable non-volatile memory device is generally maintained to be greater than a predetermined number. If the total number of the spare physical blocks is smaller than the predetermined number, a garbage collection procedure is executed. In the garbage collection procedure, valid data scattered in the rewritable non-volatile memory device is collected and centrally stored back in the rewritable non-volatile memory device, so as to release new spare physical blocks.

During the garbage collection procedure, if the host system continuously stores data, the rewritable non-volatile memory device may probably store the data coming from the host system while executing the garbage collection procedure, or may first pause storing the data coming from the host system to accelerate an execution speed of the garbage collection procedure. However, regardless whether the rewritable non-volatile memory device stores the data coming from the host system while executing the garbage collection procedure or first pauses storing the data coming from the host system during the garbage collection procedure, a writing speed of the rewritable non-volatile memory device on the data coming from the host system is in an unpredictable state. For example, at a certain time point, the writing speed of the rewritable non-volatile memory device on the data coming from the host system is probably a full speed, while at a next time point, the rewritable non-volatile memory device may completely pause storing the data coining from the host system due to the garbage collection procedure.

Nothing herein should be construed as an admission of knowledge in the prior art of any portion of the present disclosure. Furthermore, citation or identification of any document in this application is not an admission that such document is available as prior art to the present disclosure, or that any reference forms a part of the common general knowledge in the art.

SUMMARY

Accordingly, the present disclosure is directed to a memory management method, a memory storage device and a memory control circuit unit, by which a writing speed of a rewritable non-volatile memory module is in a stable state.

An exemplary embodiment of the present disclosure provides a memory management method, which is adapted to a rewritable non-volatile memory module, and the rewritable non-volatile memory module includes a plurality of physical erasing units. The method includes following steps. First data is received. A total number of first type physical erasing units among the physical erasing units is detected, where each of the physical erasing units belonging to the first type physical erasing unit does not store valid data. A first procedure is executed if the total number of the first type physical erasing units is smaller than a first threshold value. Execution of the first procedure is stopped if the total number of the first type physical erasing units is greater than a second threshold value, where the second threshold value is greater than the first threshold value. The first procedure includes following steps. Second data is received from the rewritable non-volatile memory module. The first data and the second data are temporarily stored. A writing rule is dynamically determined according to a storage status of the physical erasing units, and the first data and the second data are stored into the rewritable non-volatile memory module according to the writing rule, such that a writing speed of the rewritable non-volatile memory module corresponding to the first data in the first procedure is not lower than a predetermined value.

Another exemplary embodiment of the present disclosure provides a memory storage device including a connection interface unit, a rewritable non-volatile memory module and a memory control circuit unit. The connection interface unit is coupled to a host system. The rewritable non-volatile memory module includes a plurality of physical erasing units. The memory control circuit unit is coupled to the connection interface unit and the rewritable non-volatile memory module, where the memory control circuit unit receives first data from the host system, where the memory control circuit unit further detects a total number of first type physical erasing units among the physical erasing units, where each of the physical erasing units belonging to the first type physical erasing unit does not store valid data. If the total number of the first type physical erasing units is smaller than a first threshold value, the memory control circuit unit instructs to execute a first procedure. If the total number of the first type physical erasing units is greater than a second threshold value, the memory control circuit unit instructs to stop the first procedure, where the second threshold value is greater than the first threshold value. In the first procedure, the memory control circuit unit receives second data from the rewritable non-volatile memory module, temporarily stores the first data and the second data, and dynamically determines a writing rule according to a storage status of the physical erasing units, and stores the first data and the second data into the rewritable non-volatile memory module according to the writing rule, such that a writing speed of the rewritable non-volatile memory module corresponding to the first data in the first procedure is not lower than a predetermined value.

Another exemplary embodiment of the present disclosure provides a memory control circuit unit, which is adapted to control a rewritable non-volatile memory module, where the rewritable non-volatile memory module includes a plurality of physical erasing units. The memory control circuit unit includes a host interface, a memory interface, a buffer memory and a memory management circuit. The host interface is coupled to a host system. The memory interface is coupled to the rewritable non-volatile memory module. The memory management circuit is coupled to the host interface, the memory interface and the buffer memory, where the memory management circuit receives first data from the host system, where the memory management circuit further detects a total number of first type physical erasing units among the physical erasing units, where each of the physical erasing units belonging to the first type physical erasing unit does not store valid data. If the total number of the first type physical erasing units is smaller than a first threshold value, the memory management circuit instructs to execute a first procedure. If the total number of the first type physical erasing units is greater than a second threshold value, the memory management circuit instructs to stop the first procedure, where the second threshold value is greater than the first threshold value. In the first procedure, the memory management circuit receives second data from the rewritable non-volatile memory module, temporarily stores the first data and the second data to the buffer memory, and dynamically determines a writing rule according to a storage status of the physical erasing units, and stores the first data and the second data into the rewritable non-volatile memory module according to the writing rule, such that a writing speed of the rewritable non-volatile memory module corresponding to the first data in the first procedure is not lower than a predetermined value.

According to the above descriptions, in an exemplary embodiment of the present disclosure, when the total number of the first type physical erasing units in the rewritable non-volatile memory module is smaller than a first threshold value, the first procedure is executed. After the first procedure is executed, a writing rule is dynamically determined according to the storage status of the physical erasing units, and the first data received from the host system and the second data received from the rewritable non-volatile memory module are stored into the rewritable non-volatile memory module according to the writing rule. In this way, a writing speed of the rewritable non-volatile memory module corresponding to the first data in the first procedure is more stable.

It should be understood, however, that this Summary may not contain all of the aspects and embodiments of the present disclosure, is not meant to be limiting or restrictive in any manner, and that the disclosure as disclosed herein is and will be understood by those of ordinary skill in the art to encompass obvious improvements and modifications thereto.

In order to make the aforementioned and other features and advantages of the present disclosure comprehensible, several exemplary embodiments accompanied with figures are described in detail below.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure.

DESCRIPTION OF EMBODIMENTS

Figure 1:
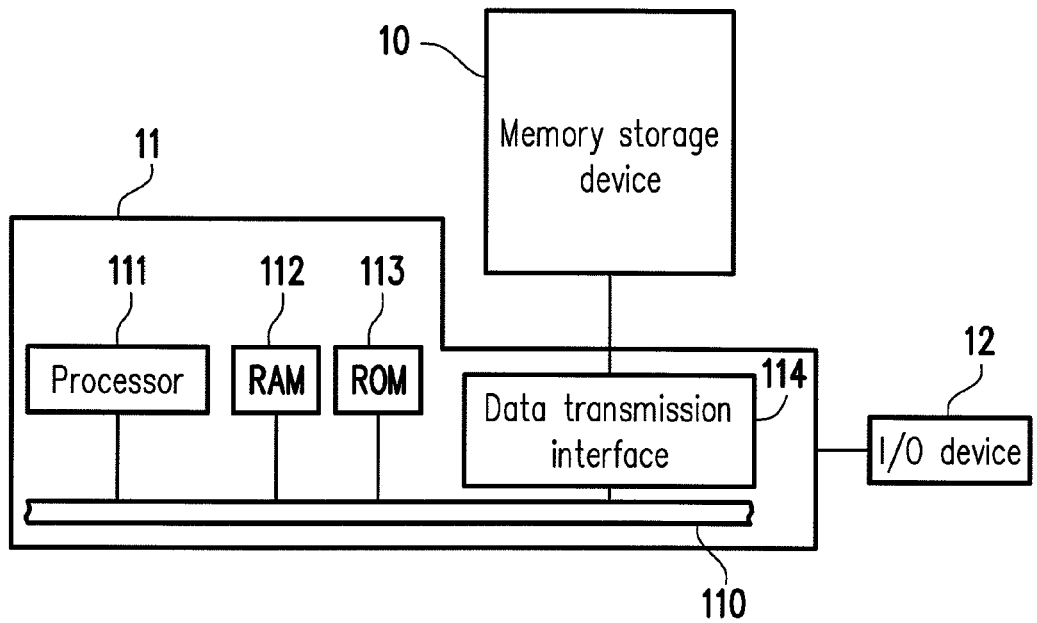
FIG. 1 is a schematic diagram of a host system, a memory storage device and an input/output (I/O) device according to an exemplary embodiment of the present disclosure.

Reference will now be made in detail to the present preferred embodiments of the disclosure, examples of which are illustrated in the accompanying drawings. Wherever possible, the same reference numbers are used in the drawings and the description to refer to the same or like parts.

Generally, a memory storage device (which is also referred to as a memory storage system) includes a rewritable non-volatile memory module and a controller (which is also referred to as a control circuit). The memory storage device is generally used together with a host system, and the host system can write data into the memory storage device and read data from the memory storage device.

Figure 2:
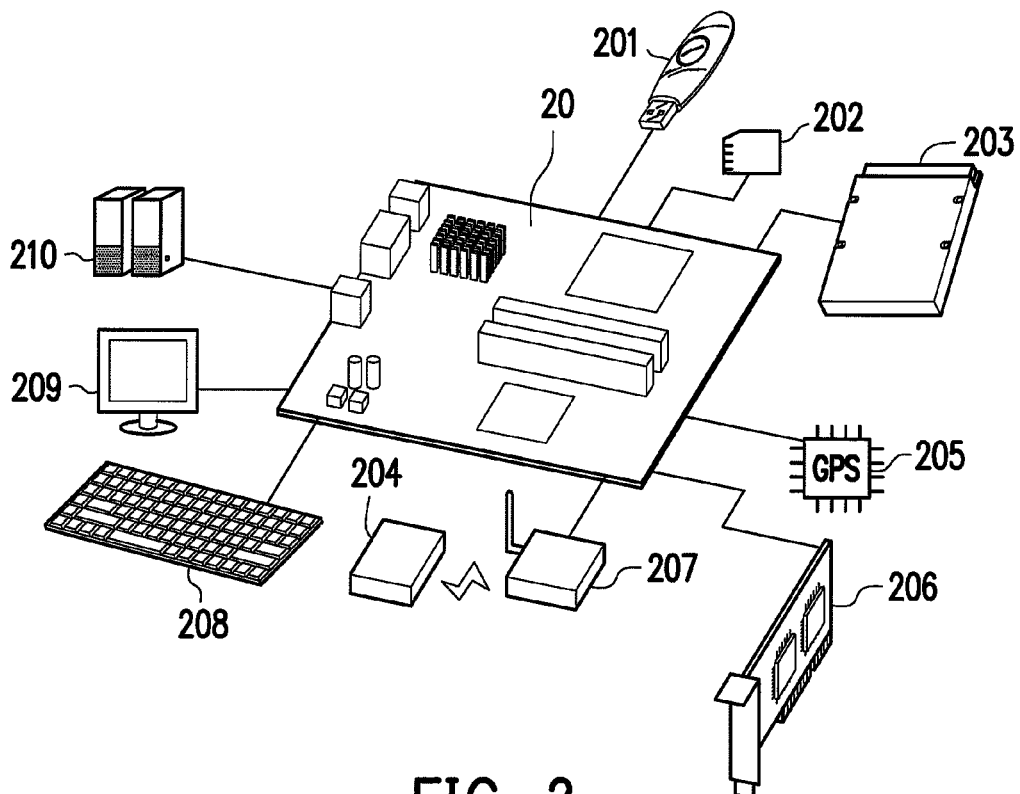
FIG. 2 is a schematic diagram of a host system, a memory storage device and an I/O device according to another exemplary embodiment of the present disclosure.

FIG. 1 is a schematic diagram of a host system, a memory storage device and an input/output (I/O) device according to an exemplary embodiment of the present disclosure. FIG. 2 is a schematic diagram of a host system, a memory storage device and an I/O device according to another exemplary embodiment of the present disclosure.

Referring to FIG. 1 and FIG. 2, the host system 100 generally includes a processor 111, a random access memory (RAM) 112, a read only memory (ROM) 113 and a data transmission interface 114. The processor 111, the RAM 112, the ROM 113 and the data transmission interface 114 are all coupled to a system bus 110.

In the present exemplary embodiment, the host system 11 is coupled to the memory storage device 10 through the data transmission interface 114. For example, the host system 11 may store data into the memory storage device 10 or read data from the memory storage device 10 through the data transmission interface 114. Moreover, the host system 11 is coupled to the I/O device 12 through the system bus 110. For example, the host system 11 may transmit an output signal to the I/O device 12 or receive an input signal from the I/O device 12 through the system bus 110.

In the present exemplary embodiment, the processor 111, the RAM 112, the ROM 113 and the data transmission interface 114 can be disposed on a motherboard 20 of the host system 11. The number of the data transmission interface 114 can be one or plural. The motherboard 20 can be coupled to the memory storage device 10 in a wired or wireless manner through the data transmission interface 114. The memory storage device 10 is, for example, a flash drive 201, a memory card 202, a solid state driver (SSD) 203 or a wireless memory storage device 204. The wireless memory storage device 204 is, for example, a memory storage device based on a wireless communication technique, such as a near field communication (NFC) memory storage device, a wireless fidelity (WiFi) memory storage device, a bluetooth memory storage device or a low power bluetooth memory storage device (for example, iBeacon), etc. Moreover, the motherboard 20 can also be coupled to various I/O devices such as a global positioning system (GPS) module 205, a network interface card 206, a wireless transmission device 207, a keyboard 208, a screen 209, a loudspeaker 210, etc., through the system bus 110. For example, in an exemplary embodiment, the motherboard 20 may access the wireless memory storage device 204 through the wireless transmission device 207.

Figure 3:
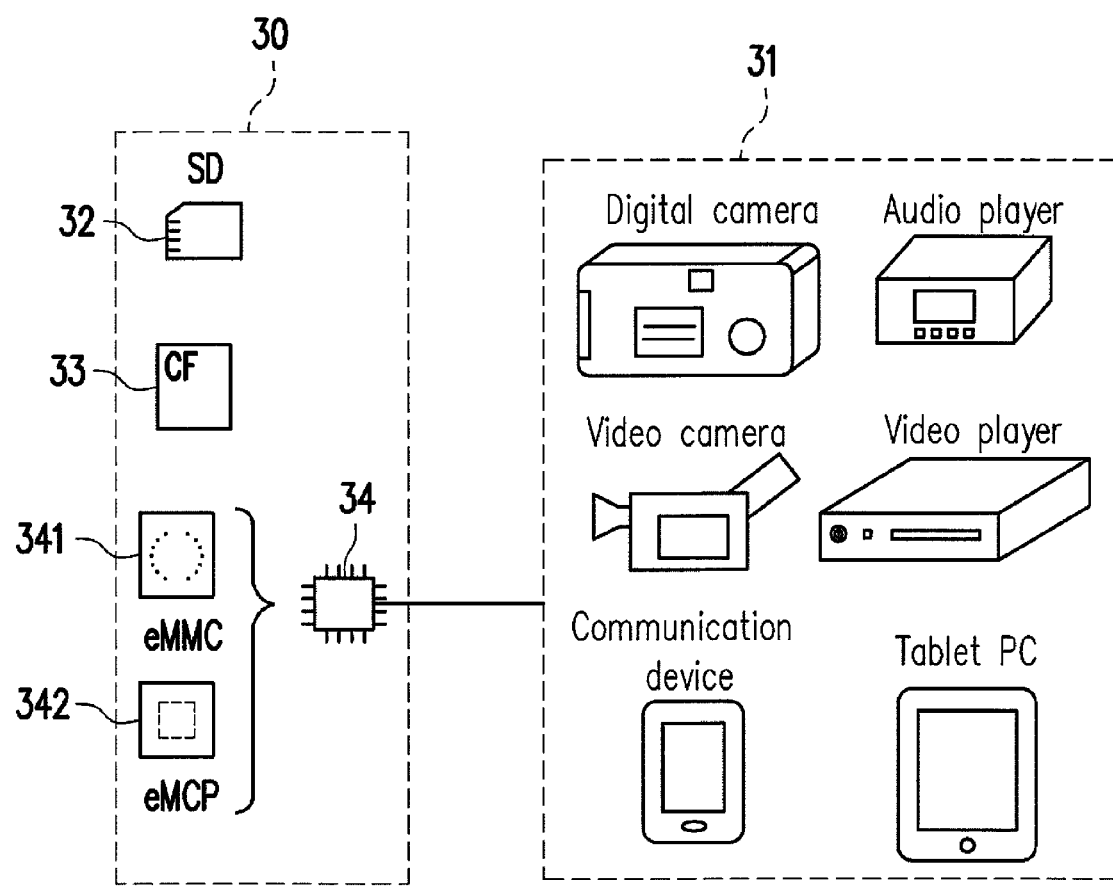
FIG. 3 is a schematic diagram of a host system and a memory storage device according to another exemplary embodiment of the present disclosure.

In an exemplary embodiment, the aforementioned host system can be any system substantially cooperated with the memory storage device to store data. In the aforementioned exemplary embodiment, the host system implemented by a computer system is taken as an example for description, and FIG. 3 is a schematic diagram of a host system and a memory storage device according to another exemplary embodiment of the present disclosure. Referring to FIG. 3, in another exemplary embodiment, the host system 31 can also be a digital camera, a video camera, a communication device, an audio player, a video player or a tablet PC, etc., and the memory storage device 30 can be a non-volatile memory storage device such as a secure digital (SD) card 32, a compact flash (CF) card 33, or an embedded storage device 34, etc., used by the host system 31. The embedded storage device 34 includes an embedded multimedia card (eMMC) 341 and/or an embedded multi chip package (eMCP) storage device 342, etc., that is formed by directly coupling various memory modules to a substrate of the host system.

Figure 4:
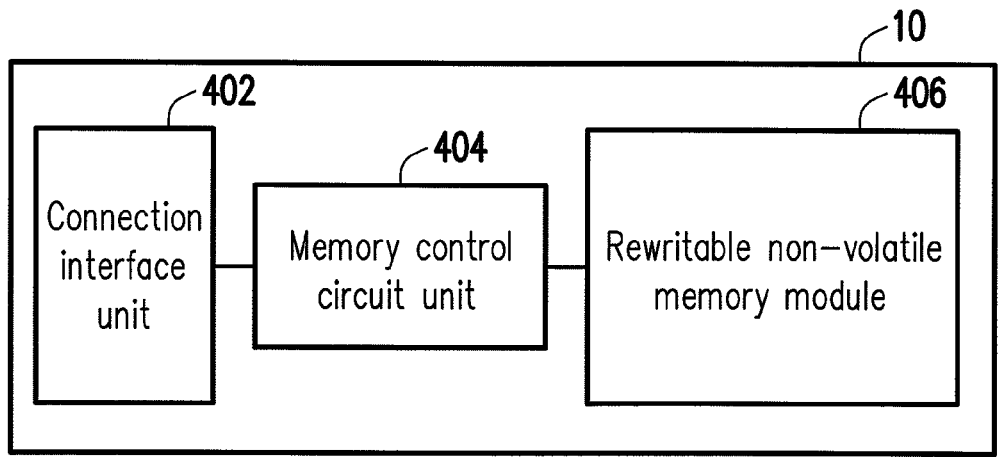
FIG. 4 is a schematic block diagram of a memory storage device according to an exemplary embodiment of the present disclosure.

FIG. 4 is a schematic block diagram of a memory storage device according to an exemplary embodiment of the present disclosure.

Referring to FIG. 4, the memory storage device 10 includes a connection interface unit 402, a memory control circuit unit 404 and a rewritable non-volatile memory module 406.

In the present exemplary embodiment, the connection interface unit 402 is complied with a serial advanced technology attachment (SATA) standard. However, it should be noted that the present disclosure is not limited thereto, and the connection interface unit 402 can also be complied with a parallel advanced technology attachment (PATA) standard, an institute of electrical and electronic engineers (IEEE) 1394 standard, a peripheral component interconnect (PCI) express standard, a universal serial bus (USB) standard, an SD interface standard, an ultra high speed-I (UHS-I) interface standard, an ultra high speed-II (UHS-II) interface standard, a memory stick (MS) interface standard, a multi-chip package interface standard, a multimedia card (MMC) interface standard, an eMMC interface standard, a universal flash storage (UFS) interface standard, an eMCP interface standard, a CF interface standard, an integrated device electronics (IDE) standard or other suitable standards. The connection interface unit 402 and the memory control circuit unit 404 can be packaged in one chip, or the connection interface unit 402 is configured outside a chip containing the memory control circuit unit 404.

The memory control circuit unit 404 may execute a plurality of logic gates or control instructions implemented in a hardware form or a firmware form, and may perform a writing operation, a reading operation or an erasing operation on the rewritable non-volatile memory module 406 according to commands of the host system 11. In the following exemplary embodiment, description of operations of various circuits in the memory control circuit unit 404 is equivalent to description of the operations of the memory control circuit unit 404.

The rewritable non-volatile memory module 406 is coupled to the memory control circuit unit 404 for storing data written by the host system 11. The rewritable non-volatile memory module 406 can be a single level cell (SLC) NAND flash memory module (i.e., a flash memory module with one memory cell storing data of one bit), a multi level cell (MLC) NAND flash memory module (i.e., a flash memory module with one memory cell storing data of two bits), a triple level cell (TLC) NAND flash memory module (i.e., a flash memory module with one memory cell storing data of three bits), other flash memory modules or other memory modules having the same characteristic.

Each memory cell of the rewritable non-volatile memory module 406 stores one or a plurality of bits through variation of a voltage (which is referred to as a threshold voltage hereinafter). To be specific, a control gate and a channel of each cell have a charge trapping layer therebetween. By applying a writing voltage to the control gate, an amount of electrons of the charge trapping layer can be changed, so as to change the threshold voltage of the memory cell. The procedure of changing the threshold voltage is referred to as "writing data into the memory cell" or "programming the memory cell". Along with the variation of the threshold voltage, each memory cell of the rewritable non-volatile memory module 406 has a plurality of storage states. By applying a reading voltage, the storage state of the memory cell can be determined, so as to obtain one or a plurality of bits stored in the memory cell.

Figure 5:
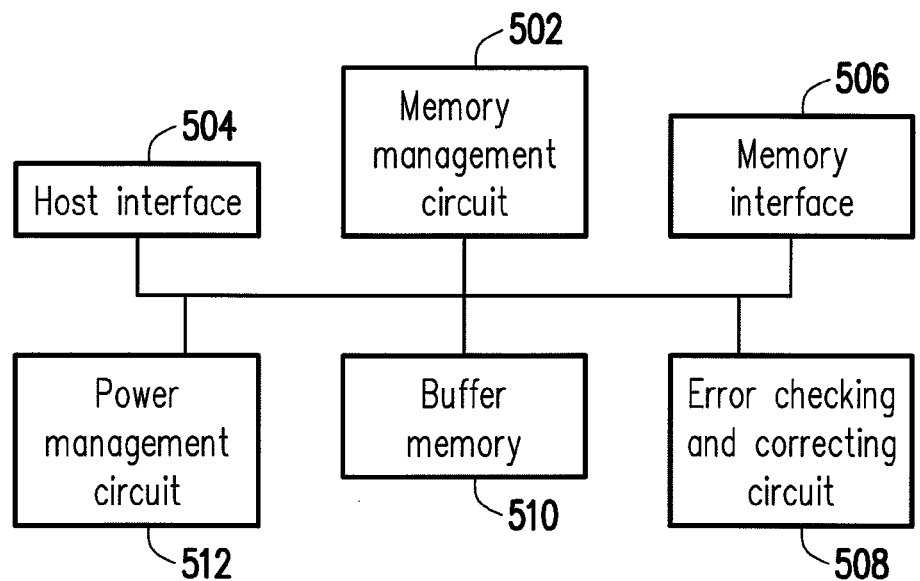
FIG. 5 is a schematic block diagram of a memory control circuit unit according to an exemplary embodiment of the present disclosure.

FIG. 5 is a schematic block diagram of a memory control circuit unit according to an exemplary embodiment of the present disclosure.

Referring to FIG. 5, the memory control circuit unit 404 includes a memory management circuit 502, a host interface 504, a memory interface 506 and a buffer memory 510.

The memory management circuit 502 is configured to control a whole operation of the memory control circuit unit 404. To be specific, the memory management circuit 502 has a plurality of control instructions, and when the memory storage device 10 operates, these control instructions are executed to implement data writing, reading, erasing operations, etc. Following description of the operations of the memory management circuit 502 is equivalent to description of the operations of the memory control circuit unit 404.

In the present exemplary embodiment, the control instructions of the memory management circuit 502 are implemented in a firmware form. For example, the memory management circuit 502 has a micro processing unit (not shown) and a read-only memory (not shown), and these control instructions are burned in the read-only memory.

When the memory storage apparatus 10 operates, these control instructions are executed by the micro processing unit to implement the data writing, reading, erasing operations, etc.

In another exemplary embodiment, the control instructions of the memory management circuit 202 may also be stored in a specific area (for example, a system area used for storing system data in the memory module) of the rewritable non-volatile memory module 406 as program codes. Moreover, the memory management circuit 502 has a micro processing unit (not shown), a read-only memory (not shown) and a random access memory (RAM) (not shown). Particularly, the read-only memory has a boot code, and when the memory control circuit unit 404 is enabled, the micro processing unit first runs the boot code to load the control instructions stored in the rewritable non-volatile memory module 406 to the RAM of the memory management circuit 502. Then, the micro processing unit executes these control instructions to implement the data writing, reading, erasing operations, etc.

Moreover, in another exemplary embodiment of the present disclosure, the control instructions of the memory management circuit 502 may also be implemented in a hardware form. For example, the memory management circuit 502 includes a micro controller, a memory cell management circuit, a memory writing circuit, a memory reading circuit, a memory erasing circuit and a data processing circuit. The memory cell management circuit, the memory writing circuit, the memory reading circuit, the memory erasing circuit and the data processing circuit are coupled to the micro controller. The memory cell management circuit is used for managing memory cells of the rewritable non-volatile memory module 406 or groups thereof. The memory writing circuit is used for sending a writing command sequence to the rewritable non-volatile memory module 406 to write data into the rewritable non-volatile memory module 406. The memory reading circuit is used for sending a reading command sequence to the rewritable non-volatile memory module 406 to read data from the rewritable non-volatile memory module 406. The memory erasing circuit is used for sending an erasing command sequence to the rewritable non-volatile memory module 406 to erase data in the rewritable non-volatile memory module 406. The data processing circuit is used for processing data to be written into the rewritable non-volatile memory module 406 and data read from the rewritable non-volatile memory module 406. The writing command sequence, the reading command sequence and the erasing command sequence may respectively include one or a plurality of program codes or command codes, and are used for instructing the rewritable non-volatile memory module 406 to execute the corresponding writing, reading, erasing operations, etc. In an exemplary embodiment, the memory management circuit 502 may further send other types of command sequences to the rewritable non-volatile memory module 406 to execute corresponding operations.

The host interface 504 is coupled to the memory management circuit 502, and is configured to receive and recognize commands and data transmitted by the host system 11. Namely, the commands and data transmitted by the host system 11 are transmitted to the memory management circuit 502 through the host interface 504. In the present exemplary embodiment, the host interface 504 is complied with the SATA standard. However, the present disclosure is not limited thereto, and the host interface 504 can also be complied with the PATA standard, the IEEE 1394 standard, the PCI express standard, the USB standard, the SD standard, the UHS-I standard, the UHS-II standard, the MS standard, the MMC standard, the eMMC standard, the UFS standard, the CF standard, the IDE standard or other suitable data transmission standards.

The memory interface 506 is coupled to the memory management circuit 502 and is configured to access the rewritable non-volatile memory module 406. Namely, data to be written into the rewritable non-volatile memory module 406 is converted into a format that can be accepted by the rewritable non-volatile memory module 406 through the memory interface 506. To be specific, when the memory management circuit 502 accesses the rewritable non-volatile memory module 406, the memory interface 506 sends corresponding command sequences. For example, the command sequences may include a writing command sequence indicating to write data, a reading command sequence indicating to read data, an erasing command sequence indicating to erase data, and corresponding command sequences indicating various memory operations (for example, to change a reading voltage level or execute a garbage collection procedure, etc.). These command sequences are, for example, generated by the memory management circuit 502, and are transmitted to the rewritable non-volatile memory module 406 through the memory interface 506. These command sequences may include one or a plurality of signals, or data on the bus. The signals or data may include command codes or program codes. For example, the reading command sequence may include information of an identification code, a memory address, etc. for reading.

The buffer memory 510 is coupled to the memory management circuit 502 and is used for temporarily storing data and commands coming from the host system 11, or data coming from the rewritable non-volatile memory module 406.

In an exemplary embodiment, the memory control circuit unit 404 further includes an error checking and correcting circuit 508 and a power management circuit 512.

The error checking and correcting circuit 508 is coupled to the memory management circuit 502 and is used for executing an error checking and correcting procedure to ensure correctness of data. To be specific, when the memory management circuit 502 receives a writing command from the host system 11, the error checking and correcting circuit 508 generates an error correcting code (ECC) and/or an error detecting code (EDC) for the data corresponding to the writing command, and the memory management circuit 502 writes the data corresponding to the writing command and the corresponding ECC and/or the EDC to the rewritable non-volatile memory module 406. Then, when the memory management circuit 502 reads data from the rewritable non-volatile memory module 406, the ECC and/or the EDC corresponding to the data are simultaneously read, and the error checking and correcting circuit 508 performs the error checking and correcting procedure on the read data according to the ECC and/or the EDC. The power management circuit 512 is coupled to the memory management circuit 502, and is used for controlling a power of the memory storage device 10.

Figure 6:
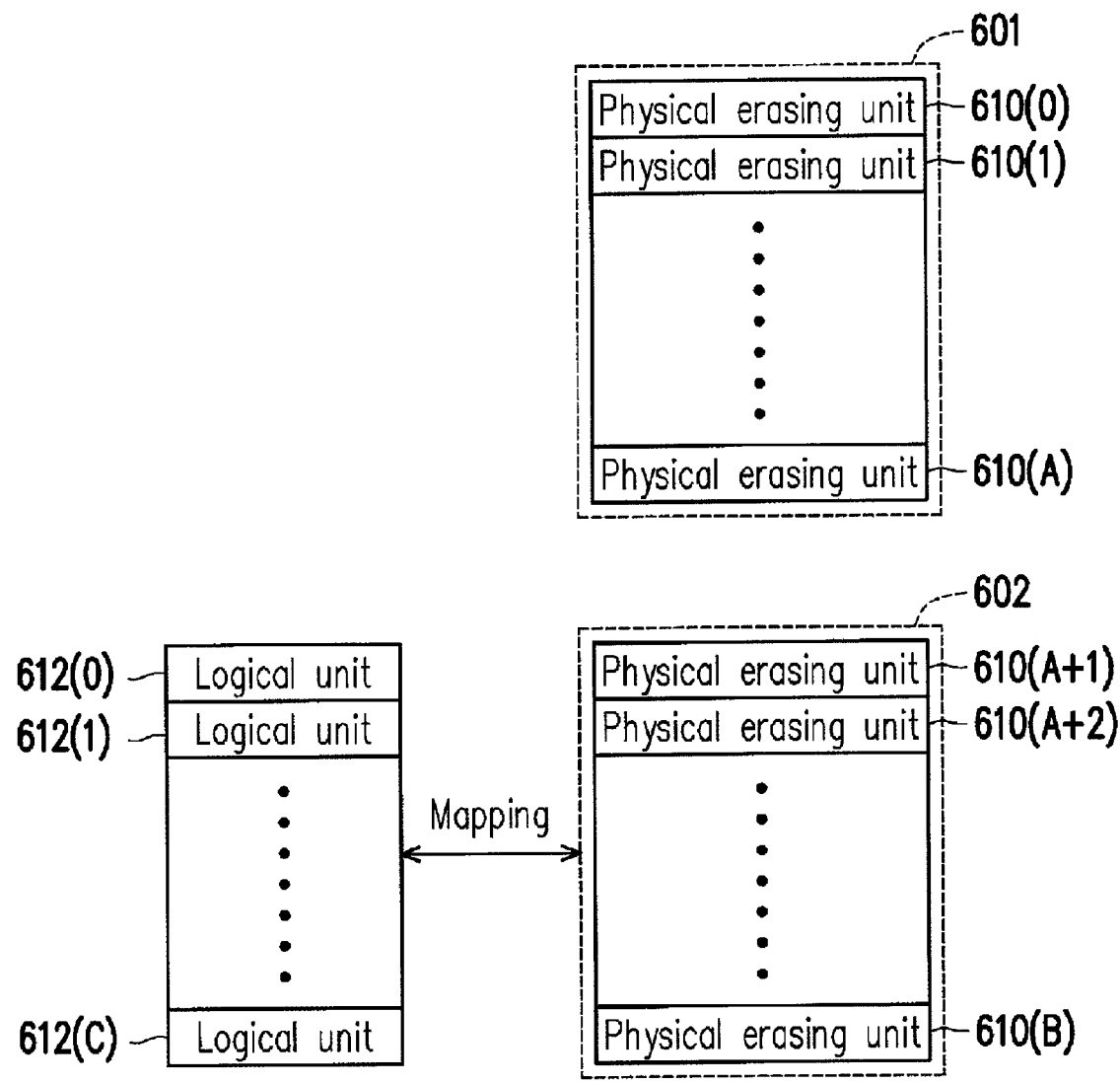
FIG. 6 is a schematic diagram of managing a rewritable non-volatile memory module according to an exemplary embodiment of the present disclosure.

FIG. 6 is a schematic diagram of managing the rewritable non-volatile memory module according to an exemplary embodiment of the present disclosure. It should be noted that in the following exemplary embodiment, in description of the operations of the physical units of the rewritable non-volatile memory module 406, the terms "select" and "group", etc. used for operating the physical erasing units are logical concept. Namely, the physical erasing units of the rewritable non-volatile memory module 406 are operated logically, while the actual locations of the physical erasing units of the rewritable non-volatile memory module 406 are not changed.

In the present exemplary embodiment, the memory cells of the rewritable non-volatile memory module 406 construct a plurality of physical programming units, and the physical programming units construct a plurality of physical erasing unit. To be specific, the memory cells on a same word line consist one or a plurality of physical programming units. If one memory cell may store two or more bits, the physical programming units on the same word line can be at least categorized into a lower physical programming unit and an upper physical programming unit. For example, a least significant bit (LSB) of one memory cell belongs to the lower physical programming unit, and a most significant bit (MSB) of one memory cell belongs to the upper physical programming unit. Generally, in an MLC NAND flash memory, a writing speed of the lower physical programming unit is greater than that of the upper physical programming unit, and/or reliability of the lower physical programming unit is higher than that of the upper physical programming unit.

In the present exemplary embodiment, physical programming unit is the smallest unit for programming data. Namely, physical programming unit is the smallest unit for writing data. For example, the physical programming unit is a physical page or a physical sector. If the physical programming unit is physical page, each physical programming unit generally includes a data bit area and a redundant bit area. The data bit area includes a plurality of physical sectors, and is configured for storing user data, and the redundant bit area is configured for storing system data (for example, error checking and correcting (ECC) codes). In the present exemplary embodiment, each data bit area includes 32 physical sectors, and the size of one physical sector is 512 bytes (B). However, in other exemplary embodiments, the data bit area may also include 8, 16 or more or less physical sectors, and the size of each physical sector can be larger or smaller. On the other hand, physical erasing unit is the smallest unit for erasing data. Namely, each physical erasing unit contains the least number of memory cells that are erased all together. For example, the physical erasing unit is a physical block.

Referring to FIG. 6, in the present exemplary embodiment, the memory management circuit 502 may initially group physical erasing units 610(0)-610(B) of the rewritable non-volatile memory module 406 into a spare region 601 and a storage region 602. For example, the physical erasing units 610(0)-610(A) belong to the spare region 601, and the physical erasing units 610(A+1)-610(B) belong to the storage region 602. For example, the memory management circuit 502 may associate a certain physical erasing unit to one of the spare region 601 and the storage region 602 through a labelling manner, etc. During an operation process of the memory storage device 10, an association relationship between a certain physical erasing unit and the spare region 601 or the storage region 602 can be dynamically varied. For example, when receiving writing data from the host system 11, the memory management circuit 502 selects a physical erasing unit from the spare region 601 to store at least a part of the writing data, and associates such physical erasing unit to the storage region 602. Moreover, after a certain physical erasing unit of the storage region 602 is erased to clear data therein, the memory management circuit 502 associates the erased physical erasing unit to the spare region 601.

In the present exemplary embodiment, each physical erasing unit belonging to the spare region 601 is an erased physical erasing unit without storing any data, and each physical erasing unit belonging to the storage region 602 stores data. Particularly, each physical erasing unit belonging to the spare region 601 does not store any valid data, and each physical erasing unit belonging to the storage region 602 may probably stores valid data and/or invalid data.

In the present exemplary embodiment, the memory management circuit 502 configures logical units 612(0)-612(C) for mapping to the physical erasing units in the storage region 602. Therefore, a total capacity of the physical erasing units 610(A+1)-610(B) is regarded as the maximum available capacity of the rewritable non-volatile memory module 406. In the present exemplary embodiment, the host system 11 accesses data stored in the physical erasing units belonging to the storage region 602 through logical addresses (LA). Therefore, each of the logical units 612(0)-612(C) refers to a logical address. However, in another exemplary embodiment, each of the logical units 612(0)-612(C) may also refer to one logical programming unit, one logical erasing unit or consist of a plurality of continuous or discontinuous logical addresses. Moreover, each of the logical units 612(0)-612(C) can be mapped to one or a plurality of physical erasing units.

In the present exemplary embodiment, the memory management circuit 502 records a mapping relationship (which is also referred to as logical-physical mapping relationship) between the logical units and the physical erasing units to at least one logical-physical mapping table. When the host system 11 wants to read data from the memory storage device 10 or write data into the memory storage device 10, the memory management circuit 502 may execute data accessing of the memory storage device 10 according to the logical-physical mapping table.

In the present exemplary embodiment, valid data is current data (or latest data) belonging to a certain logical unit, and invalid data is not current data belonging to any logical unit. For example, if the host system 11 stores new data to a certain logical unit to overwrite old data originally stored in the logical unit, the new data stored in the storage region 602 is the current data belonging to the logical unit and is labelled as valid data, and the overwritten old data is probably still store in the storage region 602 but is labelled as invalid data. In an exemplary embodiment, if data belonging to a certain logical unit is updated, the mapping relationship between the logical unit and the physical erasing unit storing the old data belonging to the logical unit is removed, while a mapping relationship between the logical unit and the physical erasing unit storing the current data belonging to the logical unit is established. Alternatively, in another exemplary embodiment, if data belonging to a certain logical unit is updated, the mapping relationship between the logical unit and the physical erasing unit storing the old data belonging to the logical unit can be still maintained, which is determined according to an actual requirement.

In the present exemplary embodiment, the physical erasing units belonging to the spare region 601 can be referred to as first type physical erasing units or spare physical erasing units, and the physical erasing units belonging to the storage region 602 can be referred to as second type physical erasing units or non-spare physical erasing units.

In the present exemplary embodiment, the memory management circuit 502 receives data from the host system 11. For example, the data coming from the host system 11 is also referred to as first data and is temporarily stored in the buffer memory 510. Then, the memory management circuit 502 tries to store the first data to a certain physical erasing unit of the rewritable non-volatile memory module 406. For example, the physical erasing unit used for storing the first data is a certain physical erasing unit selected from the spare region 601.

In the present exemplary embodiment, the memory management circuit 502 detects a total number of the first type physical erasing units and determines whether the total number is smaller than a first threshold value. For example, the first threshold value is 2. If the total number of the first type physical erasing units is smaller than the first threshold value, the memory management circuit 502 executes a first procedure. For example, the first procedure is a data merging procedure used for collecting the valid data stored in the storage region 602. In an exemplary embodiment, the first procedure is also referred to as a garbage collection procedure. In the present exemplary embodiment, the operations of detecting the total number of the first type physical erasing units and determining whether the total number is smaller than the first threshold value are executed in response to a certain physical erasing unit is selected from the spare region 601 to the storage region 602 or continuously executed in background.

In the first procedure, the memory management circuit 502 selects at least one physical erasing unit from the storage region 602. The memory management circuit 502 instructs the rewritable non-volatile memory module 406 to read the valid data from the selected physical erasing unit and temporarily stores the collected valid data to the buffer memory 510. Then, the memory management circuit 502 centrally stores the valid data temporarily stored in the buffer memory 510 back to a certain physical erasing unit in the rewritable non-volatile memory module 406. For example, the physical erasing unit used for storing the collected valid data is a physical erasing unit selected from the spare region 601. However, the physical erasing unit used for storing the data coming from the host system 11 and the physical erasing unit used for storing the data coming from the rewritable non-volatile memory module 406 are generally not the same. Based on the processing of the first procedure, the valid data originally scattered in the storage region 602 is centrally stored, gradually. The physical erasing units stored with valid data being moved to other place can be erased and associated to the spare region 601. Therefore, after the first procedure is executed, the total number of the physical erasing units belonging to the spare region 601 is gradually increased and/or the total number of the physical erasing units storing invalid data and belonging to the storage region 602 is gradually decreased.

In the present exemplary embodiment, a process of extracting a certain physical erasing unit from the storage region 602 for associating to the spare region 601 is referred to as release of a spare physical erasing unit. During the process of executing the first procedure to release the physical erasing units, even if the host system 11 continuously instructs to store data into the memory storage device 10, the number of the physical erasing units associated to the spare region 601 may still gradually exceed the number of the physical erasing units extracted to the storage region 602 for storing data (for example, the data coming from the host system 11 and/or the valid data collected from the rewritable non-volatile memory module 406).

Through the processing of the first procedure, when the memory management circuit 502 determines that the total number of the first type physical erasing units is greater than a second threshold value, the memory management circuit 502 stops the first procedure, where the second threshold value is greater than the first threshold value. For example, the second threshold value is 10. Moreover, the first threshold value and the second threshold value can be other values, which is not limited by the present disclosure.

In the present exemplary embodiment, the valid data received by the memory management circuit 502 from the rewritable non-volatile memory module 406 in the first procedure is also referred to as second data. Moreover, in another exemplary embodiment, the second data probably contains invalid data or dummy data collected together with the valid data. After the first procedure is executed, the first data coming from the host system 11 and the second data coming from the rewritable non-volatile memory module 406 are all temporarily stored in the buffer memory 510. The memory management circuit 502 dynamically determines a writing rule according to a storage status of the physical erasing units 610(0)-610(B), and instructs to store the first data and the second data into the rewritable non-volatile memory module 406 according to the writing rule. In an exemplary embodiment, the storage status of the physical erasing units 610(0)-610(B) synchronously reflects an execution status of the first procedure.

In the present exemplary embodiment, the writing rule is used for limiting a proportion of the first data and the second data stored to the rewritable non-volatile memory module 406 within a predetermined data amount range. For example, it is assumed that the predetermined data amount range is equal to a total data amount of "K" physical programming units, the writing rule is to limit a data amount of "a" physical programming units occupied by the first data and a data amount of "b" physical programming units occupied by the second data during the process of continuously storing the data of the "K" physical programming units to the rewritable non-volatile memory module 406, where "a" and "b" are positive integers, and a sum of "a" and "b" is equal to "K". In an exemplary embodiment, the writing rule includes a writing proportion value, for example, the writing proportion value is equal to "a/b". Moreover, the value of "a" is negatively correlated to the value of "b".

Figure 7:
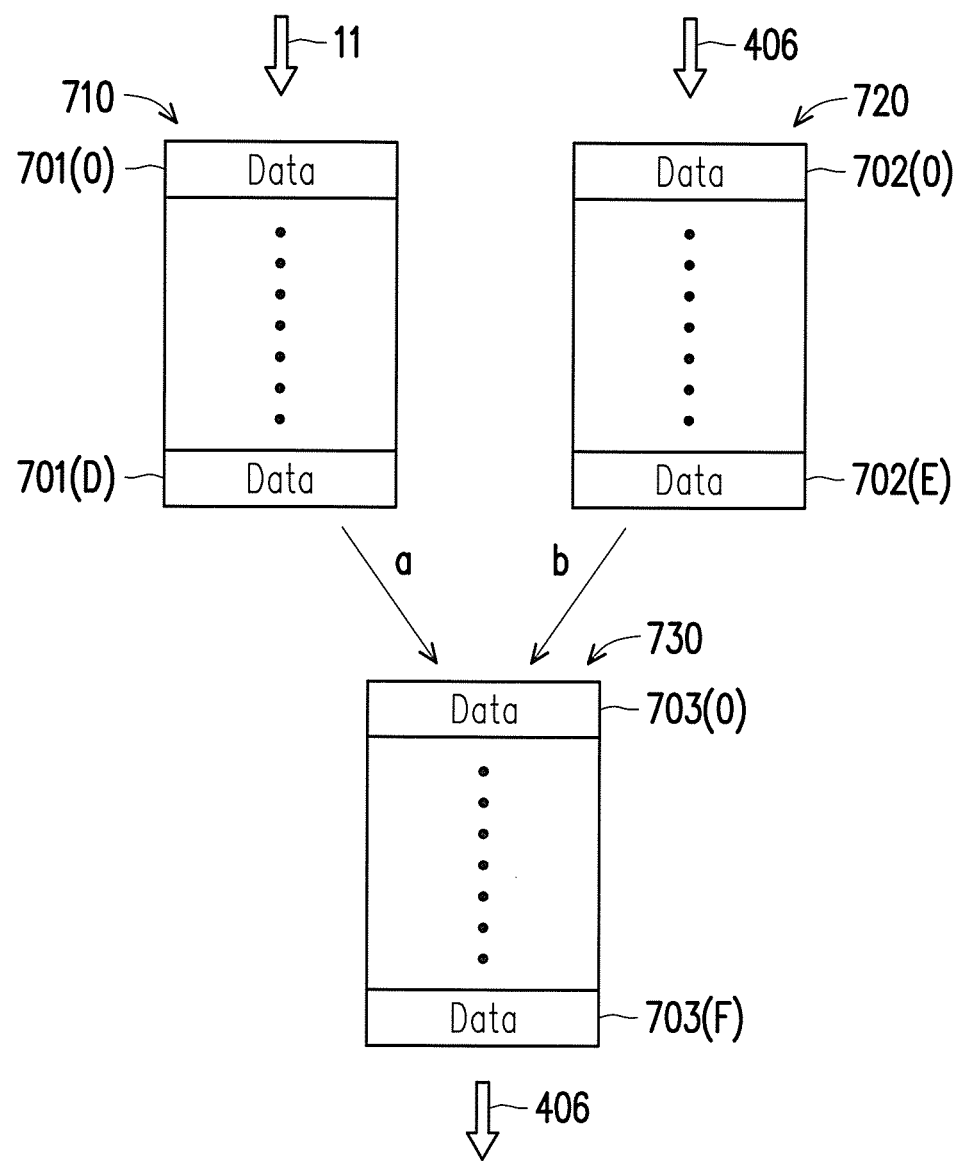
FIG. 7 is a schematic diagram of storing first data and second data according to a writing rule according to an exemplary embodiment of the present disclosure.

FIG. 7 is a schematic diagram of storing the first data and the second data according to the writing rule according to an exemplary embodiment of the present disclosure.

Referring to FIG. 7, it is assumed that the data coming from the host system 11 (i.e., the first data) is temporarily stored in a register 710 of the buffer memory 510 and the data coming from the rewritable non-volatile memory module 406 (i.e., the second data) is temporarily stored in a register 720 of the buffer memory 510, where the register 710 includes data regions 701(0)-701(D), and the register 720 includes data regions 702(0)-702(E). A capacity of each of the data regions 701(0)-701(D) and 702(0)-702(E) is equivalent to the capacity of one physical programming unit. According to the determined writing rule, the memory management circuit 502 moves data from "a" data regions in the register 710 to the register 730 of the buffer memory 510, and moves data from "b" data regions in the register 720 to the register 730. The register 730 includes data regions 703(0)-703(F). A capacity of each of the data regions 703(0)-703(F) is also equivalent to the capacity of one physical programming unit. The memory management circuit 502 sequentially stores the data temporarily stored in the register 730 to the rewritable non-volatile memory module 406.

In the present exemplary embodiment, the registers 710, 720 and 730 can be respectively regarded as an input output queue (IO queue), and data input and output of each of the registers 710, 720 and 730 are complied with a first in first output (FIFO) rule. Therefore, after "K" (K=a+b) batches of data are continuously input to the register 730, the "K" (K=a+b) batches of data are also continuously output to the rewritable non-volatile memory module 406. In the present exemplary embodiment, the "a" batches of data coming from the register 710 are first input to the register 730; thereafter, the "b" batches of data coming from the register 720 are input to the register 730. In another exemplary embodiment, the "b" batches of data coming from the register 720 are first input to the register 730; thereafter, the "a" batches of data coming from the register 710 are input to the register 730. Alternatively, in another exemplary embodiment, the "a" batches of data coming from the register 710 and the "b" batches of data coming from the register 720 can be input to the register 730 in alternation.

Moreover, in another exemplary embodiment of FIG. 7, data temporarily stored in each data region of the registers 710, 720 and 730 may also include a request message used for storing related data. For example, each request message may include data to be stored and a logical unit where the data belongs to (or a logical-physical mapping relationship), etc.

Conventionally, data coming from the host system and data collected by the garbage collection procedure are generally stored to the rewritable non-volatile memory module randomly, which results in that a writing speed of the rewritable non-volatile memory module on the data of the host system is drastically fast and drastically slow in the garbage collection procedure. Attentively, in some applications, in order to shorten an execution time of the garbage collection procedure, all writing bandwidth of the rewritable non-volatile memory module is probably used for storing back the data collected by the garbage collection procedure; and storage of the data coming from the host system is restored after the garbage collection procedure is ended. However, such operation generally results in a fact that the writing speed of the rewritable non-volatile memory module on the data of the host system in the garbage collection procedure is drastically varied between 0 and a full speed.

In the present exemplary embodiment, by storing the data (i.e., the first data and the second data) to the rewritable non-volatile memory module 406 according to the determined writing rule, bandwidths used for storing the first data and/or the second data in the first procedure, execution efficiency of the first procedure and/or execution time of the first procedure are correspondingly controlled, so as to maintain the writing speed of the rewritable non-volatile memory module 406 corresponding to the first data in the first procedure to a stable state. For example, in the exemplary embodiment of FIG. 7, every K batches of data stored to the rewritable non-volatile memory module 406 at least include "a" batches of data coming from the host system 11. The "a" batches of data are used for stabilizing the writing speed/bandwidth of the data coming from the host system 11. For example, when the execution efficiency of the first procedure is good, the execution efficiency of the first procedure can be decreased and/or the execution time of the first procedure can be prolonged by increasing the value of "a" and decreasing the value of "b" (which is equivalent to increase a writing proportion value). By decreasing the execution efficiency of the first procedure and/or prolonging the execution time of the first procedure, before the first procedure is ended, a storage bandwidth of the rewritable non-volatile memory module 406 on the data coming from the host system (i.e., the first data) is stably changed (stably increased), so as to decrease a chance that the writing speed of the rewritable non-volatile memory module 406 for the first data is drastically changed when the first procedure is ended.

In the present exemplary embodiment, during the first procedure, the used writing rule is dynamically changed for more than once. For example, in an exemplary embodiment, according to a first storage status of the physical erasing units 610(0)-610(B), the memory management circuit 502 determines a first writing proportion value, and instructs to store a first part of the first data and a first part of the second data to the rewritable non-volatile memory module 406 according to the first writing proportion value. A proportion between a data amount of the first part of the first data and a data amount of the first part of the second data is complied with the first writing proportion value. After the first part of the first data and the first part of the second data are stored to the rewritable non-volatile memory module 406, the storage status of the physical erasing units 610(0)-610(B) is probably changed, for example, changed from the first storage status to a second storage status. Therefore, according to the second storage status of the physical erasing units 610(0)-610(B), the memory management circuit 502 determines a second writing proportion value, where the first writing proportion value is different from the second writing proportion value. The memory management circuit 502 instructs to store a second part of the first data and a second part of the second data to the rewritable non-volatile memory module 406 according to the second writing proportion value. A proportion between a data amount of the second part of the first data and a data amount of the second part of the second data is complied with the second writing proportion value.

In an exemplary embodiment, the memory management circuit 502 continuously detects a total number of the first type physical erasing units, and dynamically adjusts the writing rule according to the detected total number. For example, it is assumed that the memory management circuit 502 detects the total number of the first type physical erasing units to be a first number earlier before, and determines to use the aforementioned first writing proportion value according to the first number; after the total number of the first type physical erasing units is varied (for example, the first number is changed to a second number greater than the first number) based on execution of the first procedure, the memory management circuit 502 adjusts the first writing proportion value to the second writing proportion value according to the second number, where the first number is positively correlated to the first writing proportion value, and the second number is positively correlated to the second writing proportion value.

In an exemplary embodiment, the memory management circuit 502 determines the used writing proportion value according to the first threshold value, the second threshold value, the current total number of the first type physical erasing units and a reference value (which is referred to as a first reference value hereinafter), where the first reference value corresponds to a storage status of valid data in the rewritable non-volatile memory module 406 when it is determined to stop the first procedure. For example, in an exemplary embodiment, the first reference value is used for representing the number of the physical programming units storing the valid data averaged included in each of the physical erasing units belonging to the storage region 602 when the total number of the physical erasing units belonging to the spare region 601 is greater than the second threshold value. For example, in an exemplary embodiment, the memory management circuit 502 determines the writing proportion value according to following equations (1)-(3):

$$V_m = \frac{N \times P}{(N + M - G_H)} \quad (1)$$

$$V_G = P \times \frac{P}{P - V_m} \quad (2)$$

$$R_S = \frac{P}{V_G \times \frac{(G_H - F)}{(G_H - G_L)}} \quad (3)$$

Where, $V_m$ is the first reference value; N×P represents the number of the physical programming units used for storing all of the valid data in the rewritable non-volatile memory module 406, where N represents the number of the physical erasing units used for storing all of the valid data in the rewritable non-volatile memory module 406, and P represents the number of the physical programming units included in each physical erasing unit; $(N+M-G_H)$ represents a total number of the physical erasing units storing data (i.e., the physical erasing units belonging to the storage region 602) in the rewritable non-volatile memory module 406 when the first procedure is ended, where M represents a total number of the physical erasing units initially configured in the spare region 601, and $G_H$ is the second threshold value; $V_G$ represents the number of the second type physical programming units required for storing the collected data in order to increase the total number of the first type physical erasing units by a predetermined number (for example, 1) in the first procedure; $R_S$ is the writing proportion value; F is a total number of the first type physical erasing units; and $G_L$ is the first threshold value.

According to the equations (1)-(3), if the current first procedure releases quite a few number of spare physical erasing units, $R_S$ is increased; and if the current first procedure releases a less number of the spare physical erasing units, $R_S$ is decreased. If $R_S$ is increased, the value of "a" in the exemplary embodiment of FIG. 7 is correspondingly increased, and the value of "b" is correspondingly decreased; alternatively, if $R_S$ is decreased, the value of "a" in FIG. 7 is correspondingly decreased, and the value of "b" is correspondingly increased.

In an exemplary embodiment, the memory management circuit 502 obtains a difference value between the first reference value and a second reference value, where the second reference value corresponds to a storage status of the valid data stored in a specific physical erasing unit (which is also referred to as first physical erasing unit hereinafter). For example, the first physical erasing unit is a physical erasing unit currently selected to collect the valid data (i.e., at least a part of the second data) therefrom in the storage region 602, and the second reference value can be used to represent the number of the physical programming units storing the valid data in the first physical erasing unit. The memory management circuit 502 determines a second credit value according to the difference value between the first reference value and the second reference value, where the difference value between the first reference value and the second reference value is positively correlated to the second credit value. The memory management circuit 502 determines a first credit value according to the first reference value, the second reference value and the second credit value. The memory management circuit 502 determines the writing proportion value according to the first reference value, the second reference value, the first credit value and the second credit value, where the first credit value is positively correlated to the writing proportion value, and the second credit value is negatively correlated to the writing proportion value.

For example, in an exemplary embodiment, the memory management circuit 502 determines the writing proportion value according to following equations (4)-(8):

$$C_G = V_m - V \quad (4)$$

$$E_G = f_G \times C_G \quad (5)$$

$$E_H = \min(f_H \times C_H, P) \quad (6)$$

$$R_S = \frac{P + E_H}{(V + E_G) \times \frac{P}{(P - V_m)}} \quad (7)$$

$$C_H = C_H - E_H \times \frac{(P - V_m)}{P} + \frac{E_G}{(V + E_G)} \times (P - V_m) \quad (8)$$

where, V is the second reference value; $C_G$ is the difference value between the first reference value $V_m$ and the second reference value V; $E_G$ is the second credit value; $E_H$ is the first credit value; $C_H$ is a transition value used for calculating the first credit value $E_H$; while $f_G$ and $f_H$ are constants, where $0 < f_G \leq 1$, and $0 \leq f_H < 1$.

According to the equations (4)-(8), the first credit value $E_H$ is used for increasing a writing data amount (i.e., the value of "a" in FIG. 7) of the subsequent first data, and the second credit value $E_G$ is used for decreasing the writing data amount of the subsequent first data.

In an exemplary embodiment, the memory management circuit 502 additionally determines a third threshold value. The third threshold value is between the first threshold value and the second threshold value. After the first procedure is executed, the memory management circuit 502 determines whether the total number of the first type physical erasing units is smaller than or equal to the third threshold value. If the total number of the first type physical erasing units is smaller than or equal to the third threshold value, the memory management circuit 502 sets the transition value $C_H$ as an initial value, for example, "0". Then, the memory management circuit 502 determines whether the second reference value V corresponding to the first physical erasing units currently selected for collecting the valid data is smaller than the first reference value $V_m$. If the second reference value V is smaller than the first reference value $V_m$, the memory management circuit 502 obtains the difference value $C_G$ between the first reference value $V_m$ and the second reference value V according to the equation (4). Conversely, if the second reference value V is not smaller than the first reference value $V_m$, the memory management circuit 502 directly sets the parameter $C_G$ to "0". According to the equation (5), the memory management circuit 502 obtains the second credit value $E_G$.

In an exemplary embodiment, the memory management circuit 502 further determines whether the total number of the first type physical erasing units is smaller than the first threshold value. If the total number of the first type physical erasing units is smaller than the first threshold value, the memory management circuit 502 sets the first credit value $E_H$ to "0". Conversely, if the total number of the first type physical erasing units is not smaller than the first threshold value, the memory management circuit 502 takes a smaller one of $f_H \times C_H$ and P as the first credit value $E_H$ according to the equation (6). Then, the memory management circuit 502 calculates the writing proportion value $R_S$ according to the equation (7). Moreover, the memory management circuit 502 updates the parameter $C_G$ according to the equation (8).

Figure 8:
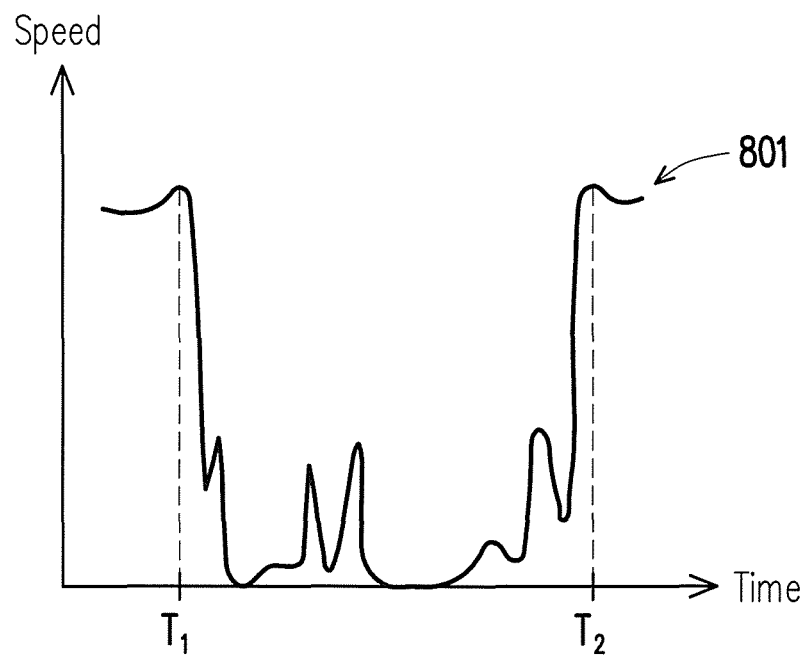
FIG. 8 and FIG. 9 are curve diagrams of a writing speed of a general memory storage device executing a garbage collection procedure.
Figure 9:
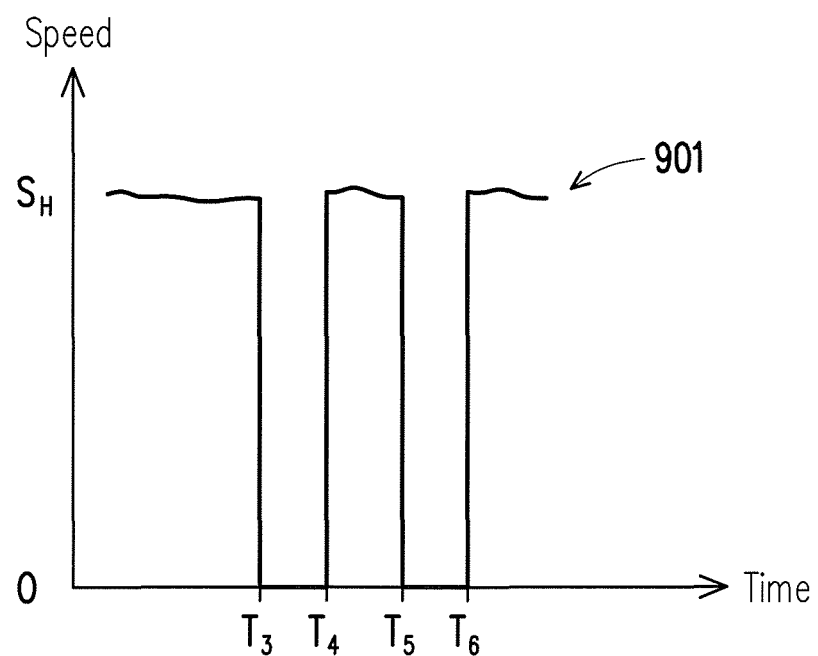

FIG. 8 and FIG. 9 are curve diagrams of a writing speed of a general memory storage device executing a garbage collection procedure, in which a horizontal axis represents time, and a vertical axis represents speed or bandwidth. For example, the speed or the bandwidth all refer to data transmitted within a unit time.

Referring to FIG. 8, if the proportion for storing the data coming from the host system and the valid data collected from the memory to the memory is not limited, in the garbage collection procedure (for example, from a time point $T_1$ to a time point $T_2$), the writing speed of the memory storage device on the data coming from the host system is drastically fast and drastically slow, shown as a curve 801. Particularly, when the garbage collection procedure is started (for example, at the time point $T_1$) and when the garbage collection procedure is ended (for example, at the time point $T_2$), the writing speed of the memory storage device is drastically changed.

Referring to FIG. 9, if the memory storage device is limited to completely stops writing the data coming from the host system during one or a plurality of time intervals (for example, from a time point $T_3$ to a time point $T_4$ and from a time point $T_5$ to a time point $T_6$) in the garbage collection procedure, during some time intervals of the garbage collection procedure (for example, from the time point $T_3$ to the time point $T_4$ and from the time point $T_5$ to the time point $T_6$), the writing speed of the memory storage device on the data coming from the host system is decreased to "0"; and during some time intervals (for example, from the time point $T_4$ to the time point $T_5$), the writing speed of the memory storage device on the data coming from the host system is jumped back to full speed (for example, $S_H$), shown as a curve 901. In this way, although the execution efficiency of the garbage collection procedure is enhanced and/or the execution time of the garbage collection procedure is shortened, variation of the writing speed of the memory storage device is still drastic.

Figure 10:
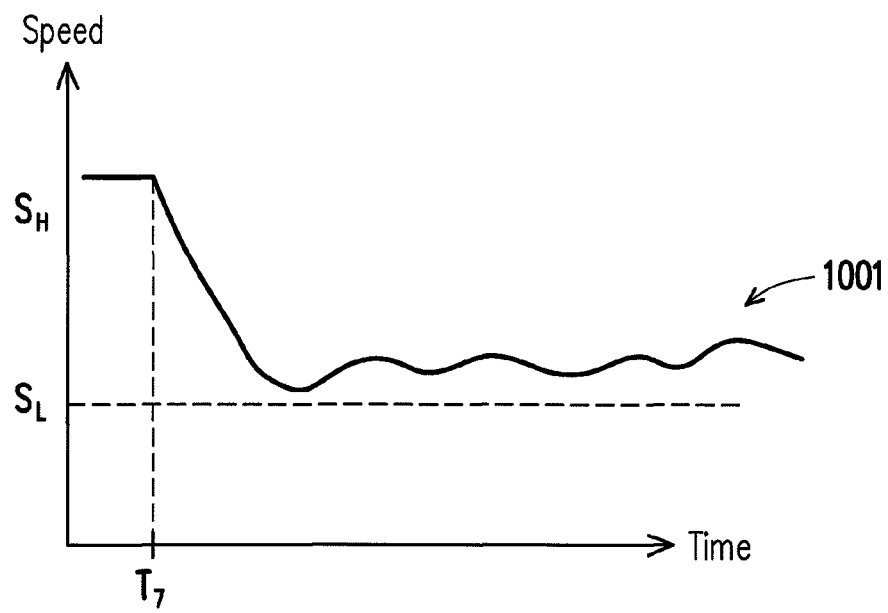
FIG. 10 and FIG. 11 are curve diagrams of a writing speed of a memory storage device according to an exemplary embodiment of the present disclosure.
Figure 11:
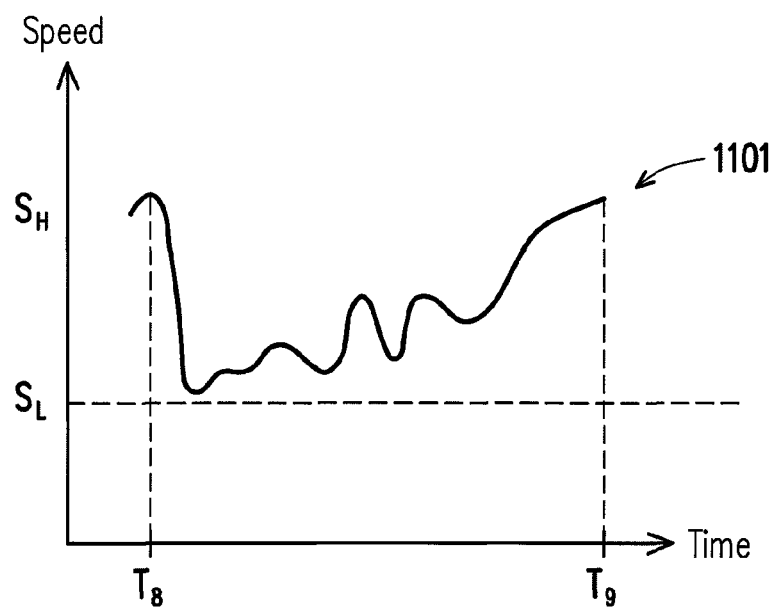

FIG. 10 and FIG. 11 are curve diagrams of a writing speed of the memory storage device according to an exemplary embodiment of the present disclosure, in which a horizontal axis represents time, and a vertical axis represents speed or bandwidth.

Referring to FIG. 10, in the present exemplary embodiment, the first procedure is executed at a time point $T_7$. In the present exemplary embodiment, the writing proportion value used in the first procedure is dynamically determined according to the equations (1)-(3) or a similar manner, and the first data and the second data are stored according to the writing proportion value. In the present exemplary embodiment, the writing speed of the memory storage device 10 on the data coming from the host system 11 is probably shown as a curve 1001. For example, during execution of the first procedure, the writing speed of the memory storage device 10 on the data coming from the host system 11 is maintained to be around a speed $S_L$ and is not less than the speed $S_L$. Compared to the conventional manner (for example, FIG. 8 and FIG. 9), the execution time of the first procedure of the present exemplary embodiment is relatively long, and the curve 1001 is gently increased along with increase of the execution time of the first procedure. For example, when the first procedure is about to be ended, the writing speed of the memory storage device 10 on the data coming from the host system 11 approaches a speed $S_H$, where the speed $S_H$ is a writing speed of the memory storage device 10 on the data coming from the host system 11 in case that the first procedure is not executed (i.e., the highest writing speed).

Referring to FIG. 11, in the present exemplary embodiment, the first procedure is executed at a time point $T_8$. In the present exemplary embodiment, the writing proportion value used in the first procedure is dynamically determined according to the equations (4)-(8) or a similar manner, and the first data and the second data are stored according to the writing proportion value. In the present exemplary embodiment, the writing speed of the memory storage device 10 on the data coming from the host system 11 is probably shown as a curve 1101. Compared to the curve 1001, an oscillation amplitude of the curve 1101 is larger and a rising speed thereof is faster. Moreover, compared to the exemplary embodiment of FIG. 10, the execution time (for example, from the time point $T_8$ to the time point $T_9$) of the first procedure in the present exemplary embodiment is shorter.

According to the exemplary embodiments of FIG. 10 and FIG. 11, the writing speed of the memory storage device 10 on the data coming from the host system 11 is relatively stable (for example, stably increased) during the process of executing the first procedure. Moreover, the writing speed of the memory storage device 10 on the data coming from the host system 11 is not less than a speed lower limit (for example, $S_L$) during the process of executing the first procedure, where the speed lower limit is greater than "0".

In an exemplary embodiment, to maintain the writing speed of the memory storage device 10 or the rewritable non-volatile memory module 406 stable (i.e., in the stable state) refers to that a variation amount of the writing speed of the memory storage device 10 or the rewritable non-volatile memory module 406 on the data (for example, the aforementioned first data) coming from the host system 11 is smaller than a predetermined variation amount within a time interval and/or the writing speed is not lower than a predetermined value (for example, $S_L$) within the time interval. In an exemplary embodiment, the time interval refers to the execution time of the first procedure. In another exemplary embodiment, the time interval particularly refers to a time interval containing a stop time point (for example, the time point $T_9$ in FIG. 11) of the first procedure. In other words, when the host system 11 continuously stores data and the first procedure is stopped, the variation amount of the writing speed of the rewritable non-volatile memory module 406 does not exceed the aforementioned predetermined variation amount.

Figure 12:
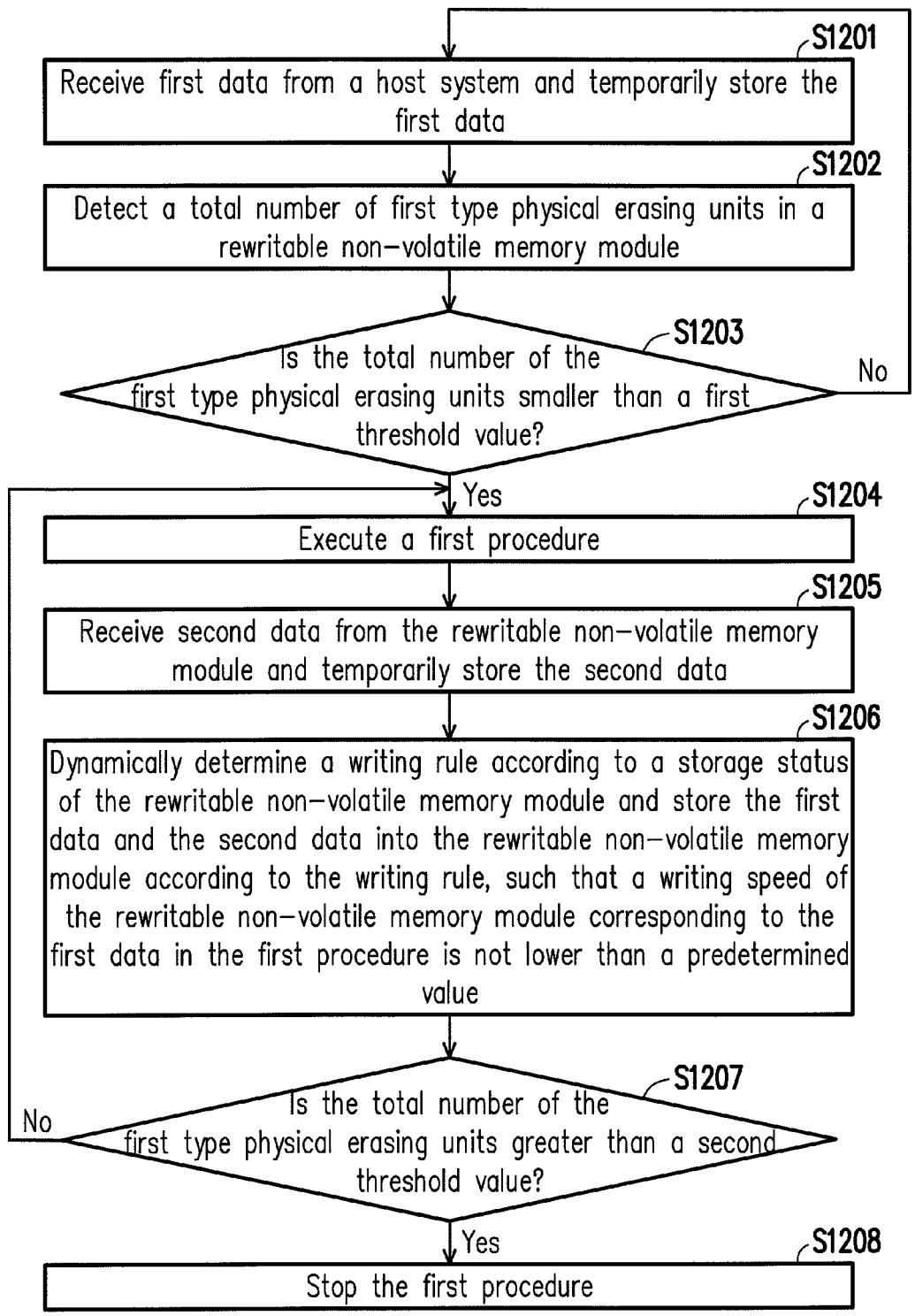
FIG. 12 is a flowchart illustrating a memory management method according to an exemplary embodiment of the present disclosure.

FIG. 12 is a flowchart illustrating a memory management method according to an exemplary embodiment of the present disclosure.

Referring to FIG. 12, in step S1201, first data is received from a host system, and the first data is temporarily stored. In step S1202, a total number of first type physical erasing units in a rewritable non-volatile memory module is detected. In step S1203, it is determined whether the total number of the first type physical erasing units is smaller than a first threshold value. If the total number of the first type physical erasing units is not smaller than the first threshold value, the step S1201 is repeated. If the total number of the first type physical erasing units is smaller than the first threshold value, in step S1204, a first procedure is executed. In step S1205, second data is received from the rewritable non-volatile memory module, and the second data is temporarily stored, where the second data at least includes valid data collected through processing of the first procedure. In step S1206, a writing rule is dynamically determined according to a storage status of the rewritable non-volatile memory module, and the first data and the second data are stored into the rewritable non-volatile memory module according to the writing rule, such that a writing speed of the rewritable non-volatile memory module corresponding to the first data in the first procedure is not lower than a predetermined value. In step S1207, it is determined whether the total number of the first type physical erasing units is greater than a second threshold value. If the total number of the first type physical erasing units is not greater than the second threshold value, the step S1204 is re-executed. If the total number of the first type physical erasing units is greater than the second threshold value, in step S1208, the first procedure is ended/stopped.

However, steps of FIG. 12 have been described in detail in the aforementioned description, and details thereof are not repeated. It should be noted that the steps of FIG. 12 can be implemented by a plurality of program codes or circuits, which is not limited by the present disclosure. Moreover, the method of FIG. 12 can be used in collaboration with the aforementioned exemplary embodiments, and can also be used alone, which is not limited by the present disclosure.

In summary, in an exemplary embodiment, when the total number of the first type physical erasing units in the rewritable non-volatile memory module is smaller than the first threshold value, the first procedure is executed. After the first procedure is executed, the writing rule is dynamically adjusted according to an execution status of the first procedure and/or a data storage status of the rewritable non-volatile memory module, and the first data received from the host system and the second data received from the rewritable non-volatile memory module are stored into the rewritable non-volatile memory module according to the dynamically adjusted writing rule. In this way, the writing speed of the rewritable non-volatile memory module corresponding to the first data in the first procedure can be more stable.

The previously described exemplary embodiments of the present disclosure have the advantages aforementioned, wherein the advantages aforementioned not required in all versions of the disclosure.

It will be apparent to those skilled in the art that various modifications and variations can be made to the structure of the present disclosure without departing from the scope or spirit of the present disclosure. In view of the foregoing, it is intended that the present disclosure cover modifications and variations of this present disclosure provided they fall within the scope of the following claims and their equivalents.

What is claimed is:

1. A memory management method, adapted to a rewritable non-volatile memory module, wherein the rewritable non-volatile memory module comprises a plurality of physical erasing units, the memory management method comprising:
   receiving first data;
   detecting a total number of first type physical erasing units among the physical erasing units, wherein each of the physical erasing units belonging to the first type physical erasing unit does not store valid data;
   executing a first procedure if the total number of the first type physical erasing units is smaller than a first threshold value; and
   stopping the first procedure if the total number of the first type physical erasing units is greater than a second threshold value, wherein the second threshold value is greater than the first threshold value,
   wherein the first procedure comprises:
   receiving second data from the rewritable non-volatile memory module;
   temporarily storing the first data and the second data; and
   dynamically determining a writing rule according to a valid data storage status of the physical erasing units during a period of executing the first procedure, and storing the first data and the second data into the rewritable non-volatile memory module according to the writing rule, such that a writing speed of the rewritable non-volatile memory module corresponding to the first data in the first procedure is not lower than a predetermined value.

2. The memory management method as claimed in claim 1, wherein the first procedure is a data merging procedure used for collecting valid data stored in the rewritable non-volatile memory module.

3. The memory management method as claimed in claim 1, wherein the step of dynamically determining the writing rule according to the valid data storage status of the physical erasing units, and storing the first data and the second data into the rewritable non-volatile memory module according to the writing rule comprises:
   determining a first writing proportion value according to a first valid data storage status of the physical erasing units;
   storing a first part of the first data and a first part of the second data to the rewritable non-volatile memory module according to the first writing proportion value, wherein a proportion between a data amount of the first part of the first data and a data amount of the first part of the second data is complied with the first writing proportion value;
   determining a second writing proportion value according to a second valid data storage status of the physical erasing units after storing the first part of the first data and the first part of the second data to the rewritable non-volatile memory module, wherein the first writing proportion value is different from the second writing proportion value; and
   storing a second part of the first data and a second part of the second data to the rewritable non-volatile memory module according to the second writing proportion value, wherein a proportion between a data amount of the second part of the first data and a data amount of the second part of the second data is complied with the second writing proportion value.

4. The memory management method as claimed in claim 1, wherein the total number of the first type physical units is changed from a first number to a second number in the first procedure, wherein the second number is greater than the first number,
   wherein the step of dynamically determining the writing rule according to the valid data storage status of the physical erasing units comprises:
   determining a writing proportion value corresponding to a proportion for storing the first data and the second data to the rewritable non-volatile memory module in the first procedure according to the second number,
   wherein the writing proportion value is positively correlated to the second number.

5. The memory management method as claimed in claim 4, wherein the step of determining the writing proportion value according to the second number comprises:
   determining the writing proportion value according to the first threshold value, the second threshold value, the second number and a first reference value, wherein the first reference value corresponds to a storage status of valid data in the physical erasing units when it is determined to stop the first procedure.

6. The memory management method as claimed in claim 1, wherein the second data is read from a first physical erasing unit belonging to a second type physical erasing unit among the physical erasing units, and the step of dynamically determining the writing rule according to the valid data storage status of the physical erasing units comprises:
   obtaining a difference value between a first reference value and a second reference value, wherein the first reference value corresponding to a storage status of valid data in the physical erasing units when it is determined to stop the first procedure, wherein the second reference value corresponding to a storage status of valid data in the first physical erasing unit;
   determining a second credit value according to the difference value between the first reference value and the second reference value, wherein the difference value between the first reference value and the second reference value is positively correlated to the second credit value;
   determining a first credit value according to the first reference value, the second reference value and the second credit value; and
   determining a writing proportion value corresponding to a proportion for storing the first data and the second data to the rewritable non-volatile memory module in the first procedure according to the first reference value, the second reference value, the first credit value and the second credit value,
   wherein the first credit value is positively correlated to the writing proportion value, and the second credit value is negatively correlated to the writing proportion value.

7. The memory management method as claimed in claim 1, wherein the first data is temporarily stored in a first register, wherein the second data is temporarily stored in a second register, wherein the dynamically determined writing rule comprises a writing proportion value, wherein the step of storing the first data and the second data into the rewritable non-volatile memory module according to the writing rule comprises:
   moving at least a part of the first data from the first register to a third register according to the writing proportion value;
   moving at least a part of the second data from the second register to the third register according to the writing proportion value, wherein a proportion between a data amount of the at least part of the first data and a data amount of the at least part of the second data is complied with the writing proportion value; and
   sequentially storing data temporarily stored in the third register to the rewritable non-volatile memory module.

8. A memory storage device, comprising:
   a connection interface unit, coupled to a host system;
   a rewritable non-volatile memory module, comprising a plurality of physical erasing units; and
   a memory control circuit unit, coupled to the connection interface unit and the rewritable non-volatile memory module,
   wherein the memory control circuit unit is configured to receive first data from the host system,
   wherein the memory control circuit unit is further configured to detect a total number of first type physical erasing units among the physical erasing units, wherein each of the physical erasing units belonging to the first type physical erasing unit does not store valid data,
   wherein the memory control circuit unit is further configured to instruct to execute a first procedure if the total number of the first type physical erasing units is smaller than a first threshold value,
   wherein the memory control circuit unit is further configured to instruct to stop the first procedure if the total number of the first type physical erasing units is greater than a second threshold value, wherein the second threshold value is greater than the first threshold value,
   wherein the memory control circuit unit, in the first procedure, is configured to:
      receive second data from the rewritable non-volatile memory module;
      temporarily store the first data and the second data; and
      dynamically determine a writing rule according to a valid data storage status of the physical erasing units during a period of executing the first procedure, and store the first data and the second data into the rewritable non-volatile memory module according to the writing rule, such that a writing speed of the rewritable non-volatile memory module corresponding to the first data in the first procedure is not lower than a predetermined value.

9. The memory storage device as claimed in claim 8, wherein the first procedure is a data merging procedure used for collecting valid data stored in the rewritable non-volatile memory module.

10. The memory storage device as claimed in claim 8, wherein the operation that the memory control circuit unit dynamically determines the writing rule according to the valid data storage status of the physical erasing units, and stores the first data and the second data into the rewritable non-volatile memory module according to the writing rule comprises:
   determining a first writing proportion value according to a first valid data storage status of the physical erasing units;
   storing a first part of the first data and a first part of the second data to the rewritable non-volatile memory module according to the first writing proportion value, wherein a proportion between a data amount of the first part of the first data and a data amount of the first part of the second data is complied with the first writing proportion value;
   determining a second writing proportion value according to a second valid data storage status of the physical erasing units after storing the first part of the first data and the first part of the second data to the rewritable non-volatile memory module, wherein the first writing proportion value is different from the second writing proportion value; and
   storing a second part of the first data and a second part of the second data to the rewritable non-volatile memory module according to the second writing proportion value, wherein a proportion between a data amount of the second part of the first data and a data amount of the second part of the second data is complied with the second writing proportion value.

11. The memory storage device as claimed in claim 8, wherein the total number of the first type physical units is changed from a first number to a second number in the first procedure, wherein the second number is greater than the first number,
   wherein the operation that the memory control circuit unit dynamically determines the writing rule according to the valid data storage status of the physical erasing units comprises:

determining a writing proportion value corresponding to a proportion for storing the first data and the second data to the rewritable non-volatile memory module in the first procedure according to the second number, wherein the writing proportion value is positively correlated to the second number.

12. The memory storage device as claimed in claim 11, wherein the operation that the memory control circuit unit determines the writing proportion value according to the second number comprises:

determining the writing proportion value according to the first threshold value, the second threshold value, the second number and a first reference value, wherein the first reference value corresponds to a storage status of valid data in the physical erasing units when it is determined to stop the first procedure.

13. The memory storage device as claimed in claim 8, wherein the second data is read from a first physical erasing unit belonging to a second type physical erasing unit among the physical erasing units, and the operation that the memory control circuit unit dynamically determines the writing rule according to the valid data storage status of the physical erasing units comprises:

obtaining a difference value between a first reference value and a second reference value, wherein the first reference value corresponding to a storage status of valid data in the physical erasing units when it is determined to stop the first procedure, wherein the second reference value corresponding to a storage status of valid data in the first physical erasing unit;

determining a second credit value according to the difference value between the first reference value and the second reference value, wherein the difference value between the first reference value and the second reference value is positively correlated to the second credit value;

determining a first credit value according to the first reference value, the second reference value and the second credit value; and determining a writing proportion value corresponding to a proportion for storing the first data and the second data to the rewritable non-volatile memory module in the first procedure according to the first reference value, the second reference value, the first credit value and the second credit value, wherein the first credit value is positively correlated to the writing proportion value, and the second credit value is negatively correlated to the writing proportion value.

14. The memory storage device as claimed in claim 8, wherein the first data is temporarily stored in a first register of the memory control circuit unit, wherein the second data is temporarily stored in a second register of the memory control circuit unit, wherein the writing rule dynamically determined by the memory control circuit unit comprises a writing proportion value, wherein the operation that the memory control circuit unit stores the first data and the second data into the rewritable non-volatile memory module according to the writing rule comprises:

moving at least a part of the first data from the first register to a third register of the memory control circuit unit according to the writing proportion value;

moving at least a part of the second data from the second register to the third register according to the writing proportion value, wherein a proportion between a data amount of the at least part of the first data and a data amount of the at least part of data of the second data is complied with the writing proportion value; and sequentially storing data temporarily stored in the third register to the rewritable non-volatile memory module.

15. A memory control circuit unit, adapted to control a rewritable non-volatile memory module, wherein the rewritable non-volatile memory module comprises a plurality of physical erasing units, the memory control circuit unit comprises:

a host interface, coupled to a host system;

a memory interface, coupled to the rewritable non-volatile memory module;

a buffer memory; and a memory management circuit, coupled to the host interface, the memory interface and the buffer memory, wherein the memory management circuit is configured to receive first data from the host system, wherein the memory management circuit is further configured to detect a total number of first type physical erasing units among the physical erasing units, wherein each of the physical erasing units belonging to the first type physical erasing unit does not store valid data, wherein the memory management circuit is further configured to instruct to execute a first procedure if the total number of the first type physical erasing units is smaller than a first threshold value, wherein the memory management circuit is further configured to instruct to stop the first procedure if the total number of the first type physical erasing units is greater than a second threshold value, wherein the second threshold value is greater than the first threshold value, wherein the memory management circuit, in the first procedure, is configured to:

receive second data from the rewritable non-volatile memory module;

temporarily store the first data and the second data to the buffer memory; and dynamically determine a writing rule according to a valid data storage status of the physical erasing units, and store the first data and the second data into the rewritable non-volatile memory module according to the writing rule, such that a writing speed of the rewritable non-volatile memory module corresponding to the first data in the first procedure is not lower than a predetermined value.

16. The memory control circuit unit as claimed in claim 15, wherein the first procedure is a data merging procedure used for collecting valid data stored in the rewritable non-volatile memory module.

17. The memory control circuit unit as claimed in claim 15, wherein the operation that the memory management circuit dynamically determines the writing rule according to the valid data storage status of the physical erasing units, and stores the first data and the second data into the rewritable non-volatile memory module according to the writing rule comprises:

determining a first writing proportion value according to a first valid data storage status of the physical erasing units;

storing a first part of the first data and a first part of the second data to the rewritable non-volatile memory module according to the first writing proportion value, wherein a proportion between a data amount of the first part of the first data and a data amount of the first part of the second data is complied with the first writing proportion value;

determining a second writing proportion value according to a second valid data storage status of the physical erasing units after storing the first part of the first data and the first part of the second data to the rewritable non-volatile memory module, wherein the first writing proportion value is different from the second writing proportion value; and storing a second part of the first data and a second part of the second data to the rewritable non-volatile memory module according to the second writing proportion value, wherein a proportion between a data amount of the second part of the first data and a data amount of the second part of the second data is complied with the second writing proportion value.

18. The memory control circuit unit as claimed in claim 15, wherein the total number of the first type physical units is changed from a first number to a second number in the first procedure, wherein the second number is greater than the first number, wherein the operation that the memory management circuit dynamically determines the writing rule according to the valid data storage status of the physical erasing units comprises:

determining a writing proportion value corresponding to a proportion for storing the first data and the second data to the rewritable non-volatile memory module in the first procedure according to the second number, wherein the writing proportion value is positively correlated to the second number.

19. The memory control circuit unit as claimed in claim 18, wherein the operation that the memory management circuit determines the writing proportion value according to the second number comprises:

determining the writing proportion value according to the first threshold value, the second threshold value, the second number and a first reference value, wherein the first reference value corresponds to a storage status of valid data in the physical erasing units when it is determined to stop the first procedure.

20. The memory control circuit unit as claimed in claim 15, wherein the second data is read from a first physical erasing unit belonging to a second type physical erasing unit among the physical erasing units, and the operation that the memory management circuit dynamically determines the writing rule according to the valid data storage status of the physical erasing units comprises:

obtaining a difference value between a first reference value and a second reference value, wherein the first reference value corresponding to a storage status of valid data in the physical erasing units when it is determined to stop the first procedure, wherein the second reference value corresponding to a storage status of valid data in the first physical erasing unit;

determining a second credit value according to the difference value between the first reference value and the second reference value, wherein the difference value between the first reference value and the second reference value is positively correlated to the second credit value;

determining a first credit value according to the first reference value, the second reference value and the second credit value; and determining a writing proportion value corresponding to a proportion for storing the first data and the second data to the rewritable non-volatile memory module in the first procedure according to the first reference value, the second reference value, the first credit value and the second credit value, wherein the first credit value is positively correlated to the writing proportion value, and the second credit value is negatively correlated to the writing proportion value.

21. The memory control circuit unit as claimed in claim 15, wherein the first data is temporarily stored in a first register of the buffer memory, wherein the second data is temporarily stored in a second register of the buffer memory, wherein the writing rule dynamically determined by the memory management circuit comprises a writing proportion value, wherein the operation that the memory management circuit stores the first data and the second data into the rewritable non-volatile memory module according to the writing rule comprises:

moving at least a part of the first data from the first register to a third register of the buffer memory according to the writing proportion value;

moving at least a part of the second data from the second register to the third register according to the writing proportion value, wherein a proportion between a data amount of the at least part of the first data and a data amount of the at least part of the second data is complied with the writing proportion value; and sequentially storing data temporarily stored in the third register to the rewritable non-volatile memory module.

* * * * *